UNITED STATES PATENT OFFICE.

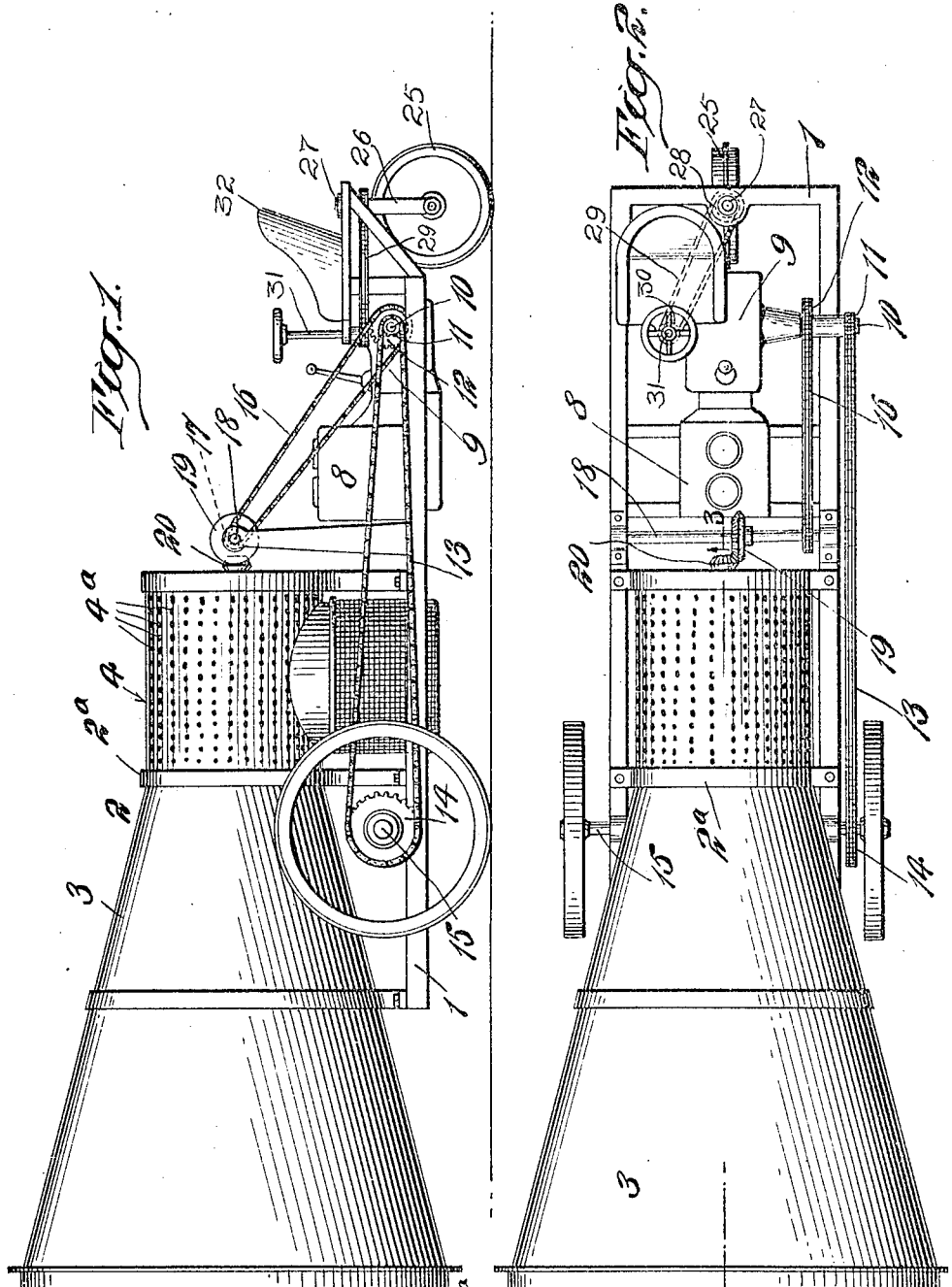

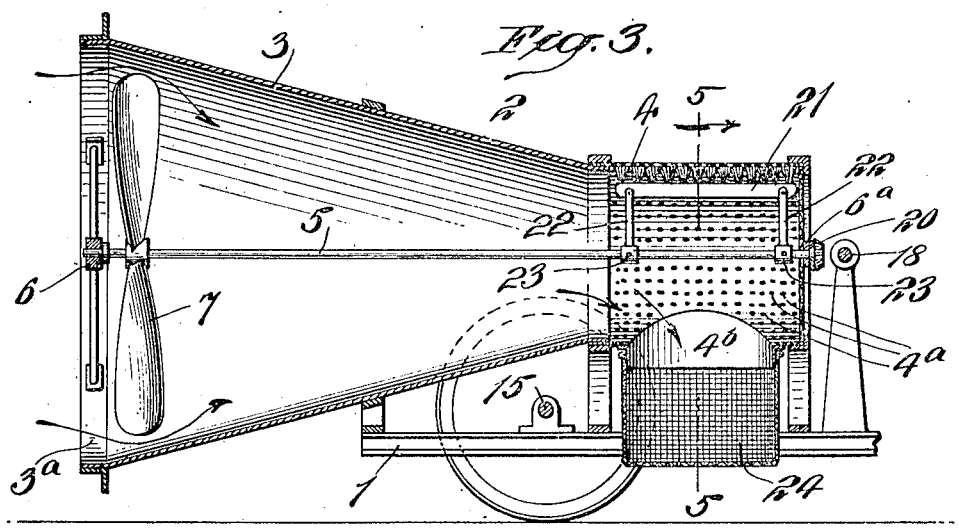
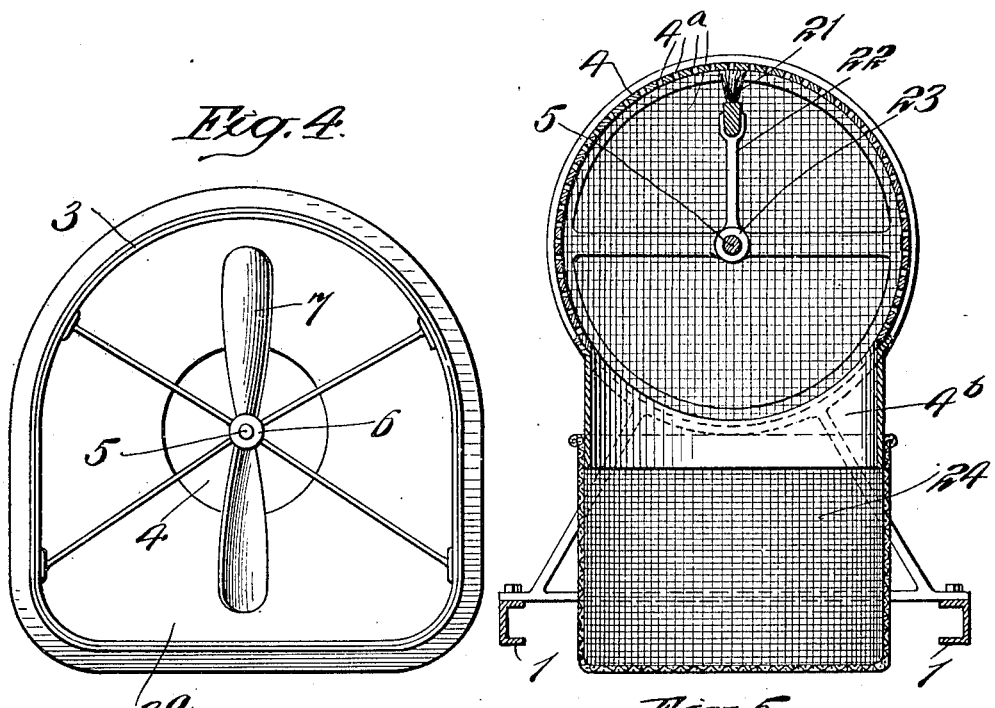

SAMUEL HAMLIN PIERCE, OF DAYTON, OHIO, ASSIGNOR OF ONE-THIRD TO WINFIELD SCOTT PIERCE, OF FREEPORT, MAINE, AND ONE-THIRD TO WALTER DE WITT KEMP, OF NEW YORK, N. Y.

INSECT-HARVESTER.

1,292,871.   Specification of Letters Patent.   Patented Jan. 28, 1919.

Application filed March 18, 1918. Serial No. 223,038.

*To all whom it may concern:*

Be it known that I, SAMUEL HAMLIN PIERCE, a citizen of the United States, and a resident of the city of Dayton, county of Montgomery, and State of Ohio, have invented certain new and useful Improvements in Insect-Harvesters, of which the following is a specification.

My invention relates to an improved insect harvester.

The primary object of my invention is to produce a machine which will collect from a field the grass-hoppers and other insects inhabiting the surface of the ground or a contiguous air stratum, and which will cause the same to be deposited in a suitable receptacle removably mounted to permit replacing when filled.

In a more intense aspect, my invention comprises the provision on a suitable vehicle of a funnel suitably supported on the vehicle having its axis disposed substantially parallel to the line of travel of the vehicle with its walls diverging in a forward direction, means within said funnel, preferably comprising a fan or blower, for creating a suction within the funnel, and means at the rear end of the funnel for filtering the sucked air and receiving and depositing the insects within a suitably removable receptacle.

My invention furthermore consists of the features of construction and arrangement of parts hereinafter specified and depicted in the accompanying drawings which form part of this disclosure.

In said drawings,

Figure 1 is a side elevation of a machine embodying my invention;

Fig. 2 is a plan view of the machine shown in Fig. 1;

Fig. 3 is a section on the line 3—3 of Fig. 2, the rear part of the vehicle being cut away;

Fig. 4 is a front view of the funnel; and

Fig. 5 is a section on the line 5—5 of Fig. 3.

Referring now to these drawings, 1 indicates the chassis of a motor vehicle on the forward part of which is mounted a suction device 2 comprising as illustrated, a funnel 3 having its axis disposed in the line of travel of the vehicle and having its walls diverging forwardly from an intermediate point $2^a$ to an open mouth or entrance $3^a$.

Suitable means for creating a suction of air through the mouth of said funnel and for filtering the sucked air to free the same from insects are provided, and I also preferably provide suitable rotating means for scraping the air filtering device to remove the insects therefrom and deposit the same in a suitable removable receptacle.

As illustrated the suction device comprises in combination with the funnel 3 a shaft 5 suitably supported axially in suitable bearings 6 and $6^a$ and propeller or blower blades 7 mounted thereon, and the air filtering means comprises a perforated drum 4 connected at the rear end of the funnel 3. Obviously when a current of air from the ground or contiguous stratum is sucked through the funnel 3, the insects carried by such air will be drawn into the drum 4 where the air is filtered through perforations $4^a$ and the insects captured.

Suitable means for rotating the shaft 5 is provided, and, as shown said shaft is rotated from the motive power of the vehicle which comprises an engine 8, transmission case 9, power shaft 10 on which shaft is mounted driving sprockets 11 and 12, the sprocket 11 having a chain drive 13 meshing with a sprocket 14 mounted on the wheel axle 15, while the sprocket 12 has a chain drive 16 with a sprocket 17 mounted on a shaft 18 to which is fixed a bevel pinion 19 which meshes with another bevel pinion 20 fixed on the axial shaft 5.

It is desirable to provide means for scraping or brushing the insects from the wall of the filtering chamber 4 and for this purpose, I preferably provide a brush 21, mounted to rotate within said chamber and, as shown, rotated from the shaft 5 by arms 22 fixed to said shaft by collars 23.

The filtering chamber 4, has a depending hopper $4^b$ connected at its lower portion and a removable receptacle such as the basket 24 is suitably supported beneath said hopper.

Suitable means for steering the vehicle and for seating the driver are provided and for this purpose, I provide a single wheel 25 mounted in a forked bearing 26, journaled intermediate the side edges of the vehicle-chassis, as at 27, and this forked bearing is provided with a sprocket wheel 28, meshing with a sprocket chain 29 which meshes with another sprocket wheel 30 mounted on a steering shaft 31, which is pivoted in any suitable way in the chassis and has at its upper end a hand wheel to permit the operator to steer the vehicle. A seat 32 is also provided in the rear of the steering shaft for the driver.

Various changes in the specific forms shown and described may be made within the scope of the claims without departing from the spirit of my invention.

I claim:—

1. In an insect harvester, the combination with a suitable vehicle and means for moving the same in one direction, of a funnel, open at its forward end with its axis disposed substantially parallel to the line of travel of the vehicle, and its walls diverging in a forward direction to project a suitable distance beyond the forward end of the vehicle and to provide an opening disposed in a substantially vertical plane and mounted on said vehicle, means for causing a suction through said funnel in the opposite direction, a perforated receiving chamber at the inner end of said funnel having a delivery aperture, and a receptacle communicating with said aperture.

2. In an insect harvester, the combination with a suitable vehicle and means for moving the same in one direction, of a funnel, open at its forward end with its axis disposed substantially parallel to the line of travel of the vehicle, and its walls diverging in a forward direction to project a suitable distance beyond the forward end of the vehicle and to provide an opening disposed in a substantially vertical plane and mounted on said vehicle, means for causing a suction through said funnel in the opposite direction, a perforated receiving chamber at the inner end of said funnel having a delivery aperture, a receptacle communicating with said aperture, and means within said receiving chamber for forcing the insects into the receptacle.

3. In an insect harvester, the combination with a suitable vehicle and means for driving the same in one direction, of a funnel mounted on said vehicle in the line of travel of the vehicle and open at its forward end with its axis disposed substantially parallel to the line of travel of the vehicle, and its walls diverging in a forward direction to project a suitable distance beyond the forward end of the vehicle and to provide an opening disposed in a substantially vertical plane, means for causing a suction through said funnel in the opposite direction, a perforated receiving chamber, cylindrical in cross section, and having a delivery aperture in the side wall thereof, a brush rotating within said chamber and contacting with the wall thereof, and a removable receptacle for said insects communicating with said aperture.

4. An insect harvester, embodying in combination a suitable vehicle, a suitable funnel, means for supporting said funnel at the forward end of said vehicle, with its open end forward, a shaft extending longitudinally within said funnel, blades mounted on said shaft to suck air through said funnel, a receiving drum communicating with the rear end of said funnel provided with a side delivery aperture and having said shaft extending therethrough, brushes mounted on said shaft and contacting with the wall of said chamber, and means for rotating said shaft.

In witness whereof, I have signed my name to the foregoing specification in the presence of two subscribing witnesses.

SAMUEL HAMLIN PIERCE. [L. S.]

Witnesses:
N. SCHONFELDT,
H. J. HOPFENGARDNER.

Copies of this patent may be obtained for five cents each, by addressing the "Commissioner of Patents, Washington, D. C."